United States Patent
Wang et al.

(10) Patent No.: US 11,836,459 B2
(45) Date of Patent: Dec. 5, 2023

(54) FLOATING-POINT DIVISION CIRCUITRY WITH SUBNORMAL SUPPORT

(71) Applicant: Apple Inc., Cupertino, CA (US)

(72) Inventors: Liang-Kai Wang, Austin, TX (US); Ian R. Ollmann, Los Gatos, CA (US); Anthony Y. Tai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/218,041

(22) Filed: Mar. 30, 2021

(65) Prior Publication Data

US 2022/0317971 A1    Oct. 6, 2022

(51) Int. Cl.
*G06F 7/487* (2006.01)
*G06F 7/499* (2006.01)

(52) U.S. Cl.
CPC .......... *G06F 7/4873* (2013.01); *G06F 7/4876* (2013.01); *G06F 7/49984* (2013.01)

(58) Field of Classification Search
CPC ....... G06F 7/4873; G06F 7/499–49915; G06F 7/535–5375; G06F 7/4876; G06F 7/49948; G06F 2207/5356; G06F 9/3001; G06F 7/49984
See application file for complete search history.

(56) References Cited

U.S. PATENT DOCUMENTS

| | | | |
|---|---|---|---|
| 8,140,608 B1 * | 3/2012 | Juffa | G06F 7/535 708/650 |
| 8,938,485 B1 * | 1/2015 | Vanderspek | G06F 7/535 708/650 |
| 10,503,473 B1 * | 12/2019 | Tai | G06F 7/4876 |

(Continued)

OTHER PUBLICATIONS

M. K. Jaiswal and H. K.-. So, "Area-Efficient Architecture for Dual-Mode Double Precision Floating Point Division," in IEEE Transactions on Circuits and Systems I: Regular Papers, vol. 64, No. 2, pp. 386-398, Feb. 2017, doi: 10.1109/TCSI.2016.2607227. (Year: 2017).*

(Continued)

*Primary Examiner* — Emily E Larocque
*Assistant Examiner* — Carlo Waje
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to circuitry for floating-point division. In some embodiments, the circuitry is configured to generate a subnormal result for a division operation that divides a numerator by a denominator. The circuitry may include floating-point circuitry configured to perform a reciprocal operation to determine a normalized mantissa value for the reciprocal of a floating-point representation of the denominator. The circuitry may further include fixed-point circuitry configured to multiply a fixed-point representation of the normalized mantissa value for the reciprocal by a mantissa of the numerator to generate an initial value. Control circuitry may determine error data for the initial value and generate a final subnormal mantissa result for the division operation based on the error data and the initial value. Embodiments with multiple modes with different accuracy guarantees are disclosed.

17 Claims, 14 Drawing Sheets

(56) References Cited

U.S. PATENT DOCUMENTS

| | | | |
|---|---|---|---|
| 2006/0064454 A1* | 3/2006 | Wang | G06F 7/496 |
| | | | 708/651 |
| 2012/0059866 A1* | 3/2012 | Conyngham | G06F 7/4873 |
| | | | 708/503 |
| 2016/0110161 A1* | 4/2016 | Lutz | G06F 7/483 |
| | | | 708/502 |
| 2018/0095726 A1* | 4/2018 | Bradbury | G06F 9/30014 |
| 2018/0321910 A1 | 11/2018 | Langhammer et al. | |
| 2020/0293285 A1 | 9/2020 | Mangnall | |
| 2020/0293330 A1 | 9/2020 | Mangnall | |

OTHER PUBLICATIONS

Corden M. "Floating-point control in the Intel C/C++ compiler and libraries or Why doesn't my application always give the same answer?". Retrieved on Apr. 13, 2022. Retrieved from the internet <https://indico.cern.ch/event/166141/sessions/125686/attachments/201416/282784/Corden_FP_control.pdf> (Year: 2012).*

Hennessy et al., "Computer Organization and Design: The Hardware/Software Interface", Fifth Edition, Chapter 1 pp. 3-59, 2014. Retrieved from <https://ict.iitk.ac.in/wp-content/uploads/CS422-Computer-Architecture-ComputerOrganizationAndDesign5thEdition2014.pdf> (Year: 2014).*

John Harrison, "Formal verification of IA-64 division algorithms," TPHOLs '00: Proceedings of the 13th International Conference on Theorem Proving in Higher Order Logics, Aug. 2000. pp. 233-251.

* cited by examiner

*Example operations performed by control circuitry for fast mode*

```c
datum_t f32mul_fast (uint32_t final_mant_before_renorm, datum_t A,
datum_t B, int32_t denormal_flushing)
{
    // Declare variables, renormalize
    // Check for special cases
    // X * (1/Y) in FTZ=0 mode is equivalent to norm(X) * 1.23
    final_mant_before_subnormal = (final_mant_before_renorm &0x7fffff)
| 0x800000;
    temp       = (uint64_t) A_renorm_mant * (uint64_t)
final_mant_before_subnormal;
    far_sticky = 0;
    //First, right shift the temp by one bit if there are two integer
    //bits, because we have 1.xxx * 1.xxxx and result may be 1x.xxxx
    two_int_bit_in_product = (((temp >> 47) & 0x1) == 0x1);
    // When we have 1x.xxxx and the exponent of the quotient is
    // (254-127 = 127), then flush to infinity
    flush_result_to_inf = (diff_exp==254) & two_int_bit_in_product;
    if (two_int_bit_in_product) {
      //otherwise, increment the exponent by 1
      far_sticky = temp & 0x1;
      temp = temp >> 1;
      diff_exp++;
    }
    // calculate the right shift amount, if diff_exp < 0, perform
    // additional right shift and collect sticky
    right_shift_mant = 1-diff_exp;
    if (diff_exp<=0) {
      if (right_shift_mant >= 64) {
        far_sticky    = far_sticky | (temp!=0);
        temp          = 0;
      } else {
        far_sticky = far_sticky|((((1<<right_shift_mant)-1)&temp)!=0);
        temp          = temp >> right_shift_mant;
      }
      diff_exp = 0;
    }
    //Capture the LSB, guard, sticky, check if increment needed
    temp_mant = temp >> 23;
    lsb       = temp_mant & 0x1;
    guard     = (temp >> 22) & 0x1;
    sticky    = ((temp & 0x3fffff)!=0);
    temp_mant = temp_mant & 0x7fffff;
    increment = (guard & (lsb | sticky | far_sticky)) & 0x1 ;
    temp      = (((diff_exp & 0xff) <<23) | temp_mant) & 0x7fffffff;
    flush_result_to_zero = (denormal_flushing==1) & (diff_exp==0);
    temp      = temp + increment;
    //Assemble the result
    R.i = r_sign | (flush_result_to_zero ? 0 : flush_result_to_inf ?
0x7f800000 : (temp & 0x7fffffff));
    }
  }
  return R;
```

FIG. 5

*Example program instructions performed by circuitry for precise-mode FP division*

```
// T0 = 1/denominator
    uint32 T0 = f32rcp_mant(denominator);

// T0 (Initial Quotient) = numerator *
// (1/normalized(denominator))
    T0 = num_denom_appx(T0, numerator, ~inversion);

// T1 (error term) = 2 - normalized(denominator) * (1/
normalized(denominator))
    uint32 T1 = num_denom_appx(T0, denominator, inversion);

// T0 (More accurate Quotient) = [numerator * (1/
normalized(denominator))] *
// [2 - normalized(denominator) * (1/normalized(denominator)) ]
    T0 = num_polish (T1, T0);

// perform correct rounding through back-multiplication again
// using denominator and numerator
    T0 = round_step1 (T0, numerator, denominator);

// Potential additional shift and back-multiply.
    R = round_step2( T0, numerator, denominator, ftz);

return R;
```

*FIG. 6*

*Example operations performed by integer unit circuitry based on approximation instruction*

```c
uint32_t num_denom_appr (uint32_t exp_mantRcpB, //internal format from f32rcp(x)
      datum_t  B, uint32_t invert_result,int32_t  denormal_flushing)
{
  uint32_t R1;
  uint32_t rcp_mant_B;
  datum_t B_renorm;
  uint32_t higher_17b_of_rcp_mant;
  uint64_t D1, D2;
  int64_t B_mant = 0;
  int32_t unused_unbiased_exp = 0;
  //extract the mantissa of the operand.
  rcp_mant_B = (exp_mantRcpB & 0x7fffff);
  //Take operand B and normalize the mantissa. As you can tell from below, only B_mant is used.
  //E.g. 0.011 * 2^(-126) => 1.100.. * 2 ^(-128)
  //We want to use the normalized operand to perform multiplication to align with the bit position of the other functions that also use the multiplier
  renormalization_with_exp_and_mant(unused_unbiased_exp, B_mant, B, denormal_flushing, debug);
  //Here, we only need the higher 17b of the mantissa from the reciprocal estimate, and we add the hidden bit in as the reciprocal estimate is always normalized
  higher_17b_of_rcp_mant = ((rcp_mant_B >> 8) & 0xffff) | ((rcp_mant_B==0)? 0x10000 : 0x08000);
  //Similar, add the hidden bit to B (the divisor) as well
  B_mant = B_mant | 0x800000;
  D1 = (uint64_t) B_mant * (uint64_t)higher_17b_of_rcp_mant;
  //Now we have aligned the input, the operation is an integer multiplication, and we just throw away the lower 8b after the multiplication is done.
  D2 = (D1 >> 8);
  //Depending on if the calling function request inversion, optionally perform 1's complement (Note: avoiding 2's complement may save area and timing
  R1 = (invert_result==1) ?
       ((~D2) & 0xffffffff) :
       (  D2  & 0xffffffff)
       ; //32bit
  return R1;
}
```

FIG. 7

*Example operations performed by integer unit circuitry based on polish instruction*

```
uint32_t num_polish (uint32_t N1, uint32_t R1, int32_t  debug) {
uint64_t N2;
  uint32_t n_ge_d;
  //Here, we produce the new intermediate quotient by multiplying
estimated quotient (N1) with the adjust factor (R1). The adjust factor
is always above 1.0
  //Both are 32b integer with N1 could be either 1.31 or 0.31, while R1
is always 1.31
  //N2 = [1|0].31(N1) x 1.31(R1)  = 2.62
  //Min R1 = 1.0
  //Max R1 = 1.0000000...1 = 1.31

//When performing 32 x 32 integer multiply, the result is 2.32. That's
  //why 63 and 62 are integer part
  //           66 66  <= this is the bit position (written vertically)
  //           32 10
  //N2 (max) = 01.31(N1) _ 31'bx
  //N2 (min) = 00.31(N1) _ 31'bx
  //Note that since there could be two integer bits, we need to perform
additional right shift to ensure we have 32b result at the end of this
function
  N2 = N1 * (uint64_t)R1;
  n_ge_d = (((N2>>62) & 0x1)==0x1);
  N2 = (N2>>30) & 0x1ffffffff; //33b valid : 1.32/0.32 format
  if (n_ge_d){
    N2 = (N2 >>1) & 0xffffffff; //we don't need the extra accuracy
  } else {
    N2 = N2 & 0xffffffff; //convert to 01.31
  }
  return (uint32_t) N2;
}
```

*FIG. 8*

*Example operations performed by integer unit circuitry based on rounding step1 instruction*

```
uint32_t rounding_step1 (uint32_t N2, datum_t A, datum_t B, int32_t
denormal_flushing, int32_t debug){
  //Declare variables
  //Normalize both dividend and divisor and capture their new mantissa,
add hidden bit to normalized mantissa //Perform an injection rounding and produce 26-bit (i.e. round-to-
nearest. => NOT round-to-nearest-even)
  //Inject a value at bit 5 of the 32b value from the estimated quotient
(32b)then right shift by 6.
  injection      = 1<<5;
  N2_injected    = ((N2+injection)>>6) & 0x3fffff;
  //find the first and second guard bits of the 26b rounded quotient
(1.23 has 24b so we have two more guard bits in the 26b value)
  first_guard    = (N2_injected >> 1) & 0x1;
  second_guard   = (N2_injected >> 0) & 0x1;
  //Get the 24b quotient (with truncation) and its incremented value. At
the end, based on the rounding direction, we either pick the truncated
value or the incremented value
  Q_trunc        = (N2_injected>>2) & 0xffffff;
  Q_incr         = (Q_trunc + 1) & 0xffffff;
  //Because we guarantee 3 more bits of accuracy, the first and the
second guard themselves would be able to tell us the rounding direction
if they are certain value.
  always_trun    = (first_guard==0x0);
  always_incr    = (first_guard==0x1) & (second_guard==0x1);
  //Now we perform the multiplication of estimated quotient with the
divisor
  q_mpy_d        = (uint64_t)N2_injected * (uint64_t) B_mant;
  //Extract the LSB (least significant bit) from A and B*Q
  A_LSB = A_mant & 0x1;
  //Extract the LSB from the product of Q * D. Note that because the
multiplication of two 1.x mantissa, the result could be 1x.xxxx, and
therefore, we need to detect that and shift the value differently.
  BQ_LSB = (((q_mpy_d >> 49) & 0x1) == 0x1) ?
           ((q_mpy_d >> 26) & 0x1) :
           ((q_mpy_d >> 25) & 0x1);
  //The equation to detect if we shall choose Q_incr or not
  need_increment = ((A_LSB==0) & (BQ_LSB==1)) | ((A_LSB==1) &
(BQ_LSB==0));
  increment_case = (always_incr| (need_increment & ~always_trun));
  final_mant_before_renorm = increment_case ? Q_incr : Q_trunc;
  //At the end, we only deliver the mantissa in this stage
  final_mant_before_renorm = final_mant_before_renorm & 0xffffff;
  return final_mant_before_renorm;
}
```

*FIG. 9*

*Example operations performed by integer unit circuitry based on rounding step 2 instruction*

```
datum_t rounding_step2 (uint32_t final_mant_before_renorm, datum_t A,
datum_t B, int32_t denormal_flushing, int32_t debug)
{
    //Declare variables (some 64 bit)
    //Check special cases and normal range
    else {//if (diff_exp<=0) { // Result is a subnormal number
       //When the diff_exp <=0, right shift mantissa (re-normalization)
       //The mantissa before re-normalization is always normalized
       //However, during injection rounding in the last step it may lose
       //the bit above MSB. In that case, value doesn't matter, need to
       // always attach 0x800000 which addresses the problem naturally
       final_mant_before_subnormal = final_mant_before_renorm | 0x800000;
       //When diff_exp is less than or equal to 0, it means the result is
a subnormal (or even zero).
       //first, calculate the right shift amount, and then shift the
mantissa. Also extract the resulting LSB and round bit
       right_shift_mant = 1-diff_exp;
       new_mantissa_with_round = (right_shift_mant>64) ? 0 :
                                     (final_mant_before_subnormal >>
(right_shift_mant-1));
       new_mantissa_lsb       = (right_shift_mant>63) ? 0 :
                                     ((final_mant_before_subnormal >>
right_shift_mant) & 0x1);
       new_mantissa_rnd       = (right_shift_mant>64) ? 0 :
                                     ((final_mant_before_subnormal >>
(right_shift_mant-1)) & 0x1);
       //If quotient is subnormal, we will never have B is also subnormal
       //Therefore, we can take the original B input to perform the
multiplication
       bq                     =
(new_mantissa_with_round<<(right_shift_mant-1)) *
                                     (0x00800000 | B_mant); //integer mult
       //Based on if dividend is greater than or equal to the divisor, we
check if B * Q is >, =, or < A
       bq_is_same_as_a = (bq == ((uint64_t)A_renorm_mant<<(24-n_ge_d)));
       bq_is_less_than_a = (bq < ((uint64_t)A_renorm_mant<<(24-n_ge_d)));
       bq_is_greater_than_a=(bq >((uint64_t)A_renorm_mant<<(24-n_ge_d)));
       //We then use that to determine if we need to increment the
subnormal quotient or not
       q_incr  = ((new_mantissa_with_round>>1) + 1) & 0xffffff;
       increment_condition   = (new_mantissa_rnd & bq_is_less_than_a) |
                                     (new_mantissa_lsb &
new_mantissa_rnd & bq_is_same_as_a);
       //Re-assemble the sign, exponent (always 0x0), and mantissa.
       R.i = r_sign | 0x0 |
          ((denormal_flushing==1) ? 0 :
           ( (increment_condition ? q_incr : ((new_mantissa_with_round>>1)
& 0x7fffff))
       )
    );
    return R;
```

FIG. 10

FLOATING-POINT DIVISION CIRCUITRY WITH SUBNORMAL SUPPORT

BACKGROUND

Technical Field

This disclosure relates generally to computer processors and more particularly to floating-point division circuitry with subnormal support.

Description of the Related Art

Floating-point division operations have been implemented using various approaches, ranging from complete software solutions, a mix of math instructions and helper instructions, and full hardware solutions. In graphics applications, division may be implemented by taking the reciprocal of the denominator followed by a floating-point multiplication. Properly handling subnormal values (also referred to as denormal values) may be challenging, particularly in reciprocal implementations. Further, different operating scenarios may present different goals, e.g., for tradeoffs between speed and accuracy for floating-point division results.

BRIEF DESCRIPTION OF THE DRAWINGS

FIG. 5 is a code listing illustrating example operations that control circuitry is configured to perform for a fast mode, according to some embodiments.

FIG. 6 is a code listing illustrating example functionality that control circuitry is configured to perform for a precise mode, according to some embodiments.

FIG. 7 is a code listing illustrating example operations that control circuitry is configured to perform for error estimation and application, according to some embodiments.

FIG. 8 is a code listing illustrating example operations that control circuitry is configured to perform to determine a more accurate quotient, according to some embodiments.

FIGS. 9 and 10 are code listings illustrating example rounding operations that control circuitry is configured to perform, according to some embodiments.

DETAILED DESCRIPTION

Figure 1A:
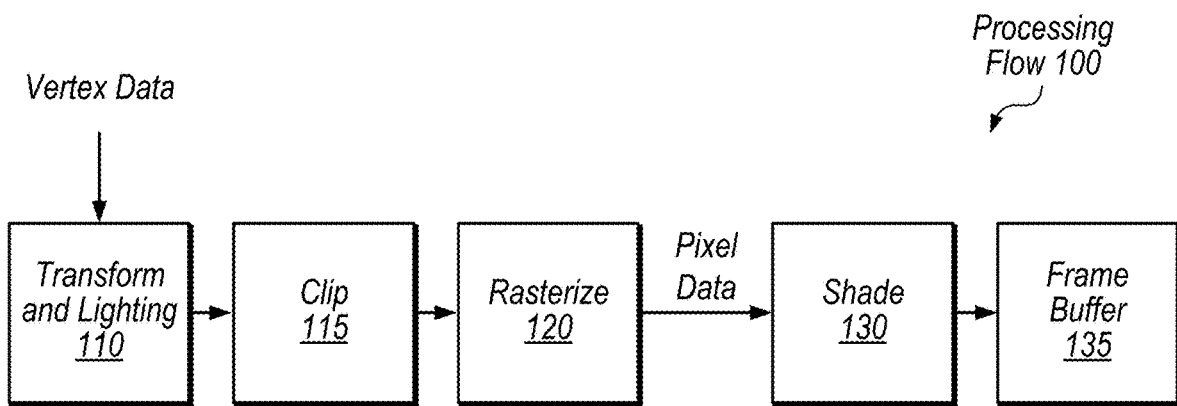
FIG. 1A is a diagram illustrating an overview of example graphics processing operations, according to some embodiments.
Figure 1B:
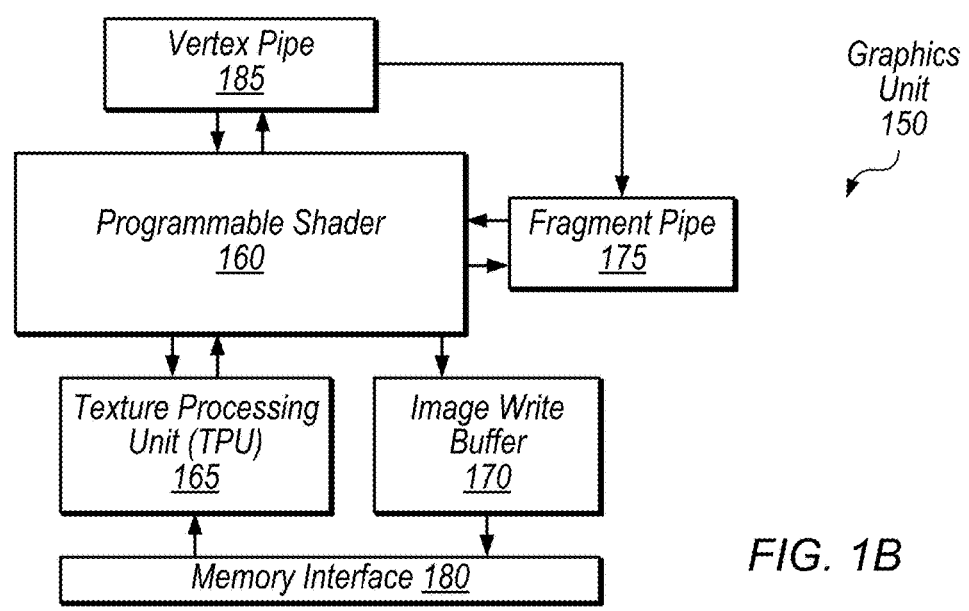
FIG. 1B is a block diagram illustrating an example graphics unit, according to some embodiments.
Figure 2:
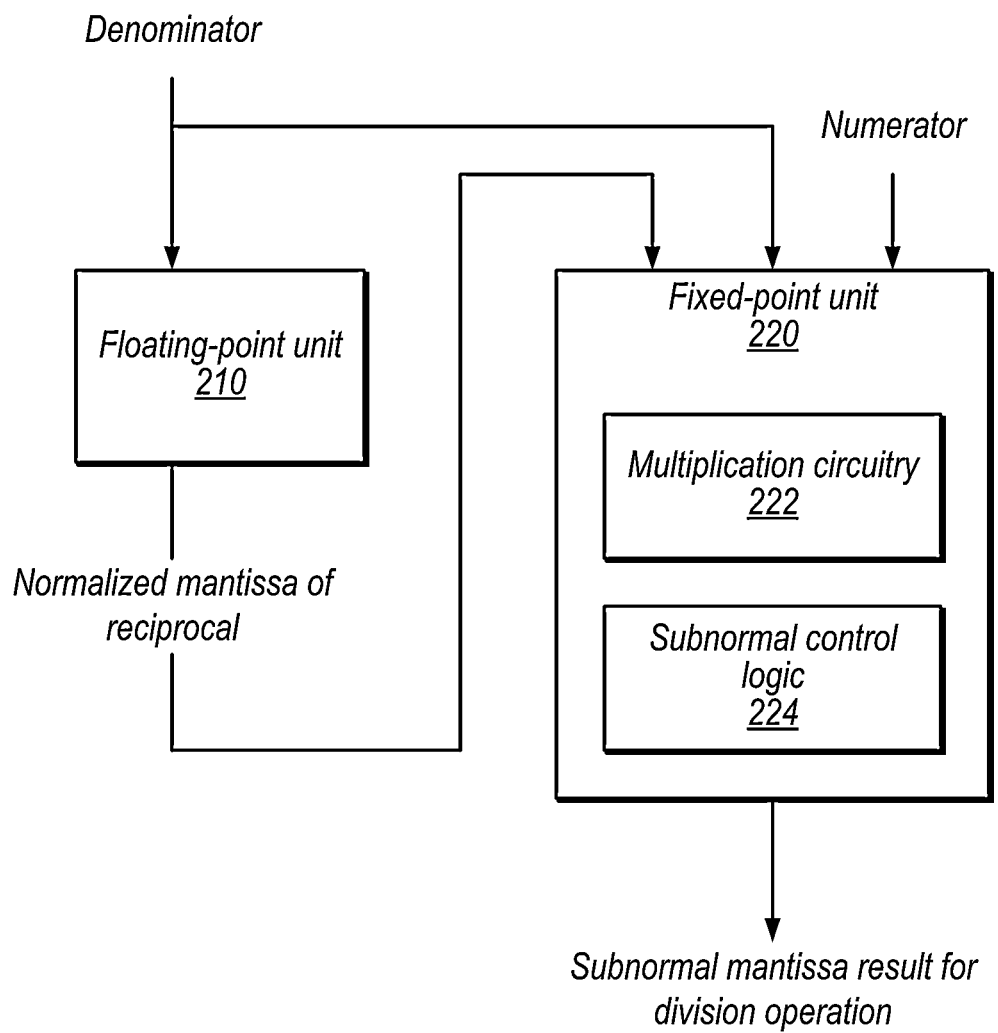
FIG. 2 is a block diagram illustrating example floating-point and fixed-point (e.g., integer) units, according to some embodiments.
Figure 3:
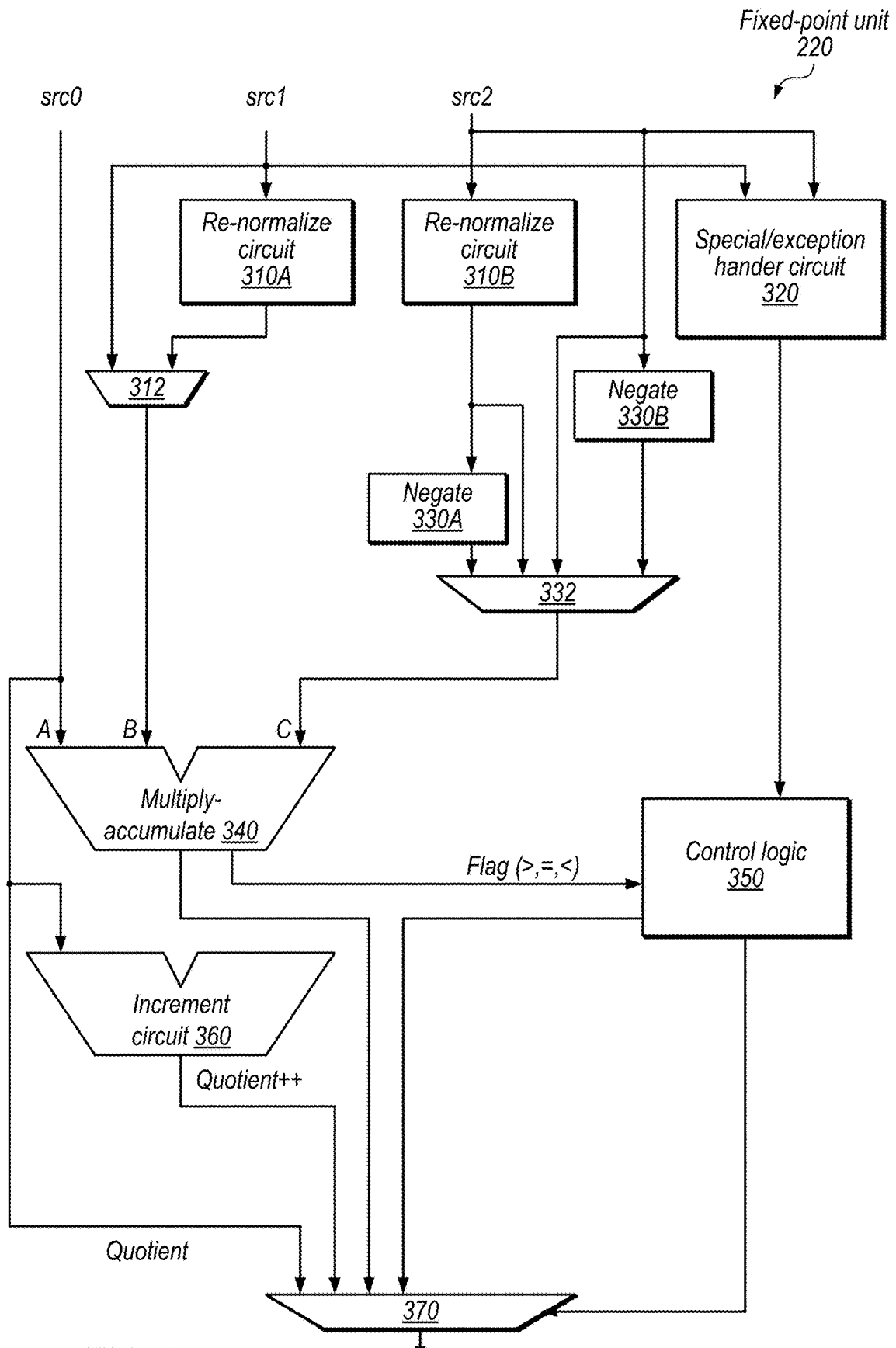
FIG. 3 is a block diagram illustrating example control circuitry included in a fixed-point unit, according to some embodiments.
Figure 4A:
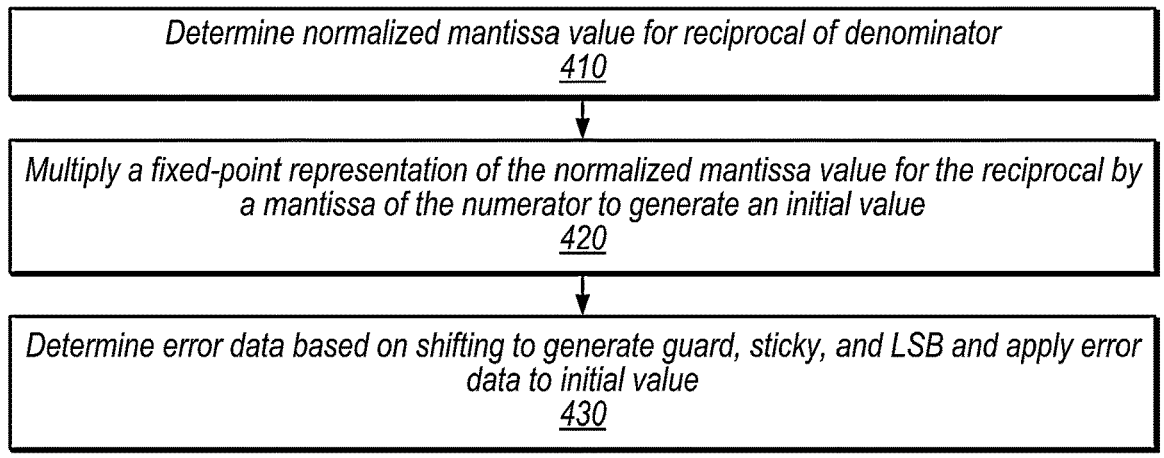
FIGS. 4A and 4B are flow diagrams illustrating example respective fast mode and precise mode techniques for floating-point division, according to some embodiments.
Figure 4B:
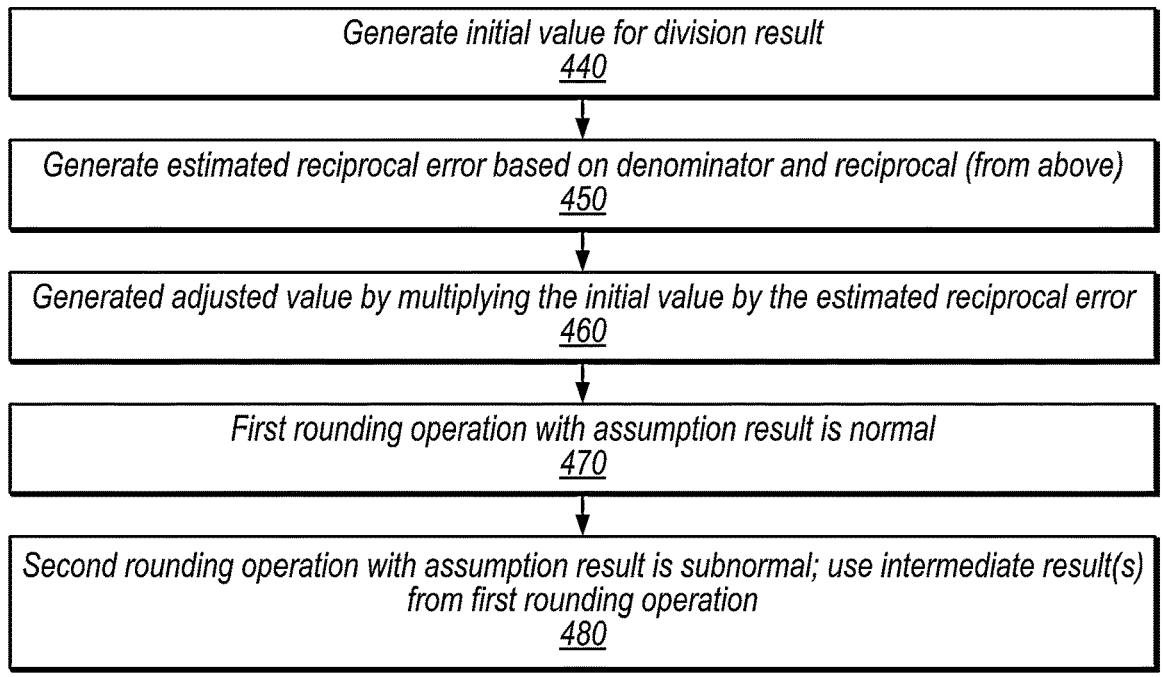

The following disclosure sets out example techniques for performing floating-point division using a reciprocal operation and using integer circuitry (e.g., a fixed point multiply-add unit and subnormal control circuitry). In particular, the circuitry multiplies the reciprocal result by the numerator and adjusts the initial product, if needed, for a subnormal output. FIGS. 1A-1B provide an overview of a graphics processor that may include the disclosed division circuitry (although disclosed techniques may be used in central processing units and various other types of processors). FIGS. 2-3 show example circuitry and FIGS. 4A-4B show example methods for different math modes with different accuracy requirements. FIGS. 5-10 show example code listings representing example operations performed by the disclosed circuitry (although note that the disclosed circuitry is typically dedicated circuitry, e.g., in an arithmetic logic unit (ALU); the code listing is included to facilitate explanation of circuit functionality). FIGS. 11-14 show example methods, computing devices, systems, and computer-readable media.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Floating-Point Division

As briefly discussed above, traditional techniques for floating-point division may be problematic when dealing with subnormal values. Many floating-point formats include sign, exponent, and mantissa fields. For example, the real value represented by an IEEE 32-bit floating-point value is:

$$-1^{sign\ bit} \cdot 2^{exponent\ value-127} \cdot \text{mantissa value with implied leading bit}$$

Floating-point systems are typically bound by the maximum and minimum exponent that can be represented in a given format and typically have a fixed mantissa width. Further, due to representation of special values such as not-a-number (NaN) and infinity, most formats are not symmetric between maximum and minimum representable numbers. When entering the subnormal domain, the mantissa becomes non-normalized. Traditional techniques (such as the Markstein method for division) may not provide correct results when the result is a subnormal number.

Example Hardware Support for Floating-Point Division with Subnormal Support

In disclosed embodiments, a processor includes hardware configured to execute instructions for floating-point divide operations that support subnormal results. In some embodiments, the hardware uses fixed-point unit (e.g., a multiply and accumulate unit) to perform many of the operations for floating-point division. This may reduce chip area and power consumption, relative to techniques with dedicated floating-point circuitry for this type of division, while providing good division performance that meets precision requirements for one or more processing modes.

FIG. 2 is a block diagram illustrating example circuitry configured to implement a floating-point divide operation, according to some embodiments. The divide operation may be specified by one or more instructions that specify a numerator and a denominator. In some embodiments, a fast-mode floating-point divide is implemented using two instructions and a precise mode floating-point divide is implemented using six instructions.

Floating-point unit 210, in the illustrated embodiment, receives the denominator and performs a floating-point reciprocal operation to generate a normalized mantissa for the reciprocal. In some embodiments, the reciprocal instruction encodes that the mantissa should be generated as a normalized mantissa, regardless of whether the result is actually a subnormal number. Note that the original denominator is also provided to fixed-point unit 220, in the illustrated embodiment, which may allow recovery of any information lost during the reciprocal operation.

Fixed-point unit 220 (e.g., an integer unit), in the illustrated embodiment, receives the denominator, the numerator, and the reciprocal result and uses multiplication circuitry 222 to multiply the mantissa of the reciprocal result by the mantissa of the numerator to generate an initial division result. Subnormal control logic 224, in the illustrated embodiment, is configured to generate error data for the division result and adjust the division result based on the error data. In some embodiments, subnormal control logic 224 supports multiple division modes. For example, a fast mode may utilize a single fixed-point instruction to generate a subnormal mantissa result for the division operation while a precise mode may execute multiple fixed-point instructions to generate a subnormal mantissa result for the division operation. Detailed example operations for these two modes are discussed in detail below.

In some embodiments, formatting circuitry (not shown) may receive the subnormal mantissa result and pack it into a desired floating-point format. Subnormal control logic 224 may be included in fixed-point unit 220 as shown or may be a separate unit.

FIG. 3 is a block diagram illustrating an example fixed-point unit 220, according to some embodiments. In the illustrated embodiment, fixed-point unit 220 includes renormalize circuits 310A and 310B, special/exception handler circuit 320, negate circuits 330A-330B, multiplexers (MUXes) 312, 332, and 370, multiply-accumulate circuitry 340, control logic 350, and increment circuit 360. Note that elements 310, 312, 320, 330A, and 350 may be added to a traditional integer multiply-accumulate circuit to provide disclosed functionality that facilitates floating-point division operations.

Renormalize circuits 310, in the illustrated embodiment, are configured to generate a fixed-point representation of a certain number of bits based on an input value that may not have that format (e.g., a normalized mantissa value). MUXes 312 and 332 are configured to select from either the unchanged src1 operand or a renormalized src1 operand and from among the unchanged src1 operand, a negation thereof, a renormalized src2 operand, or a negation thereof, e.g., based on information encoded in an instruction or microoperation being performed.

Special/exception handler circuit 320, in the illustrated embodiment, is configured to detect exception conditions and special conditions (e.g., such as infinity and NaN). Upon detection of such events, circuitry 320 may inform control logic 350, which may provide a corresponding appropriate value to MUX 370 and control MUX 370 to pass that value. Thus, the circuit may output appropriate values for special conditions when the arithmetic performed by other circuitry would not provide the proper result.

Multiply-accumulate circuit 340, in the illustrated embodiment, is configured to perform the operation A*B+C and output the result to MUX 370. In the illustrated embodiment, it also provides a flag signal to control logic 350 that indicates whether the dividend is greater than or equal to the divisor, which may be used for rounding operations, as described in detail below.

Increment circuit 360, in the illustrated embodiment, is configured to increment src0 and provide the result to MUX 370. MUX 370 also receives the unmodified src0 and selects an input based on the control signal from control logic 350.

Therefore, fixed-point unit 220, in some embodiments, maintains integer multiply-accumulate functionality while also supporting certain operations that facilitate floating-point division. Example uses of the supplemental circuitry for floating-point division are included in the code listings discussed below with reference to FIGS. 5-10. The illustrated circuitry to support these operations may use substantially less circuit area, relative to a dedicated unit for floating-point division operations, for example.

Example Fast-Mode and Precise-Mode Division Techniques

FIGS. 4A and 4B are flow diagrams illustrating example techniques for performing floating-point division using a reciprocal operation in different precision modes, according to some embodiments. FIG. 4A shows a fast mode procedure which may utilize a smaller number of clock cycles than the precise mode procedure of FIG. 4B, but guarantees a lower level of accuracy. Note that the illustrated fast and precise modes are included for purposes of explanation, but are not intended to limit the scope of the present disclosure. Disclosed techniques may be used in modes with varying levels of precision or accuracy, in various embodiments. Further, some implementations of disclosed techniques may utilize a single mode for floating-point division.

For fast mode, at 410, in the illustrated example, circuitry (e.g., of a floating-point unit) determines a normalized mantissa value for the reciprocal of the denominator. The mantissa is represented using a normalized format even if it represents a subnormal value, and control circuitry may be added to a traditional floating-point unit to force the mantissa to a normalized value for this type of reciprocal. By maintaining the reciprocal value in the normalized form, division through reciprocal-multiply may achieve better accuracy with any input range.

At 420, in the illustrated example, circuitry (e.g., of an fixed-point unit) multiplies a fixed-point representation of the normalized mantissa value for the reciprocal by a mantissa of the numerator to generate an initial value.

At 430, in the illustrated example, circuitry determines error data based on shifting to generate guard, sticky, and least significant bit (LSB) and apply error data to initial value. FIG. 5, discussed in detail below, provides pseudocode for example operations that control circuitry may be configured to determine and apply error data in fast mode.

For precise mode, at 440, in the illustrated example, circuitry generates an initial value for a division result (e.g., using the techniques of elements 410 and 420 of FIG. 4A). FIG. 6, discussed in detail below, provides pseudocode for example operations that control circuitry may be configured to perform division in precise mode.

At 450, in the illustrated example, circuitry generates an estimated reciprocal error based on the denominator and the reciprocal result (e.g., the result from element 410 of FIG. 4A).

At 460, in the illustrated example, control circuitry generates an adjusted value by multiplying the initial value by the estimated reciprocal error.

At 470, in the illustrated example, control circuitry performs a first rounding operation with an assumption that the result is normal. If this assumption is correct, the output of element 470 may be the floating-point division result. FIG. 9, discussed in detail below, provides pseudocode for example operations that control circuitry may be configured to perform to implement element 470.

At 480, in the illustrated example, control circuitry performs a second rounding operation with an assumption that the result is subnormal. This operation may use an intermediate result from the first rounding operation of element 470. In other embodiments, the first rounding operation may be skipped and the result(s) may be generated by the operation of element 480, for example. FIG. 10, discussed in detail below, provides pseudocode for example operations that control circuitry may be configured to perform to implement element 480.

FIG. 5 is a diagram illustrating example pseudocode that represents operations that may be performed by circuitry of FIGS. 2-3 to perform error estimation and application for fast-mode floating-point division, according to some embodiments. In some embodiments, fast-mode division is implemented using two instructions, e.g., as follows, where the "ftz" is provided to optionally flush subnormal results to correctly signed zero:

T0=f32rcp_mant(denominator);
R=f32mul_fastdiv(T0, numerator, denominator, ftz);

The f32_rcp_mant instruction generates a mantissa value for the reciprocal of the floating-point denominator in a normalized format (even if the result is denormal). Other than always generating a normalized result, this operation may be similar to traditional reciprocal operations. Floating-point unit 210 may support such a reciprocal instruction in various embodiments. Note that while certain formats such as int32 (a 32-bit integer format) and f32 (a 32-bit floating-point format) are discussed in the code listings for purposes of illustration, the disclosed techniques may be used with various floating-point and fixed-point formats (which includes integer formats) that use various numbers of bits.

In the illustrated example of FIG. 5, the f32mul_fast instruction operates on inputs that include final_mant_before_renorm (the result of the reciprocal operation from the first instruction), A (the numerator), B (the denominator), and denormal_flushing. As indicated in the comments, code for declaring variables, renormalizing inputs, and handling special cases (e.g., involving NaN and infinity) are omitted. The circuitry may return a predetermined value for detected special cases. Renormalization provides a normalized mantissa with a corresponding unbiased exponent. For example, if an input is 0x003fffff, the resulting normalized mantissa becomes 0xfffffc and the corresponding unbiased exponent is (1−127−2)=−128. The "2" in the equation corresponds to the number of left shifts to normalize the mantissa. In other words, from the example above, the un-normalized mantissa from the IEEE number is 0.011_1111_1111_1111_1111_1111. To normalize the mantissa, we need to left shift the unnormalized mantissa by 2 to get to 1.111_1111_1111_1111_1111_1100.

The circuitry then generates a final mantissa value before subnormal based on the final mantissa before renormalization by forcing a hidden bit (which may or may not exist, but should not be lost if it does) by ANDing with 0x7fffff and ORing with 0x800000.

The circuitry then performs a multiply temp=(uint64_t) A_renorm_mant*(uint64_t) final_mant_before_subnormal, where temp is the initial multiplication result representing the product of the numerator and the reciprocal result. This multiplication may be performed by integer multiply-accumulate circuitry 340, for example. The circuitry then right shifts if there are two integer bits and checks for a flush to infinity. The circuitry then determines a potential right-shift amount and collects sticky information. The circuitry then determines LSB, guard, and sticky information and determines whether to increment the temp value based on this information. The circuitry then assembles the result as a floating-point value, with the temp value as the mantissa unless a flush to zero or flush to infinity occurs.

The operations of FIG. 5 may advantageously provide satisfactory accuracy for certain workloads (e.g., in graphics processors) while quickly providing a result and consuming substantially less power than traditional division techniques that support subnormal results. In some situations, greater accuracy may be desired and the techniques of the following figures may be implemented.

FIGS. 6-10 are diagrams illustrating example pseudocode that represent operations that may be performed by circuitry of FIGS. 2-3 to perform precise-mode floating-point division, according to some embodiments.

FIG. 6 shows a set of example instructions used to perform floating-point division with subnormal support. (In contrast to the other example instructions of FIGS. 5 and 7-10, the illustrated instructions of FIG. 6 may actually be executed.) In some embodiments, each function includes a fixed-point multiply operation that may be performed by fixed-point unit 220. The instructions include f32rcp_mant (which may operate as described above with reference to FIG. 5), num_denom_appx, num_polish, round_step1, and round_step2. The operations for these instructions are discussed in turn below.

As explained in the comments in FIG. 6, the f32rcp_main instruction generates a value representing the reciprocal of the denominator. This instruction may perform an approximation using a third-order polynomial equation, for example, although other techniques may be implemented. It may provide at least (N+4)/2 accurate fraction bits where N is the number of fraction bits in the floating-point format.

The first num_denom_appx instruction generates an initial value T0 by multiplying the reciprocal result by the numerator. T0 may be represented in a 1.31 format with a sign bit. This instruction may also check that T0 is smaller than or equal to the quotient.

The second num_denom_appx instruction operates on the reciprocal and the original denominator and generates a value T1 that represents an error term:

$$2-\text{normalized(denom)} \cdot \text{estimated\_reciprocal(normalized(denom))}$$

T1 may also be represented in a 1.31 format and may represent the error term for the Goldschmidt algorithm.

The num_polish instruction generates a more accurate quotient by multiplying the initial value by the error term T1. The round_step1 instruction performs rounding based on the numerator and denominator using back-multiplication. This rounding step assumes that the result is normal.

The round_step2 instruction performs rounding based on the numerator and denominator and also supports a flush-to-zero (ftz) rounding mode. This rounding step assumes that the result is subnormal and uses intermediate results from the round_step1 instruction. R may be a 1.23 mantissa result. An additional shift and back-multiply may be performed if the result is subnormal. Flush-to-zero may flush the subnormal result to a correctly signed zero if this mode is selected.

FIG. 7 shows a set of example operations for the num_denom_appx instruction, according to some embodiments. The circuitry extracts the mantissa of the B operand and normalizes the mantissa. Once the inputs are aligned the circuitry performs a fixed-point multiplication and may invert the result depending on the invert_result operand.

FIG. 8 shows a set of example operations for the num_polish instruction, according to some embodiments. The circuitry produces a new intermediate quotient by multiplying the estimated quotient with the estimated error. As shown, the circuitry may use internal formats to represent the values during this process. The circuitry returns a fixed-point multiplication result.

FIG. 9 shows a set of example operations for the round_step1 instruction, according to some embodiments. The circuitry normalizes the dividend and divisor and adds a hidden bit. It performs injection rounding and picks a truncated value or incremented value based on the LSB and delivers the rounded mantissa.

FIG. 10 shows a set of example operations for the round_step2 instruction, according to some embodiments. The circuitry uses the result from round_step1 and checks for special cases and confirms a subnormal result. (Not shown: if the result is not subnormal, the circuitry may return the value from round_step1.) The circuitry right-shifts and extracts LSB and round bits. The circuitry performs a fixed-point multiplication and may shift based on whether the dividend is greater than or equal to the divisor. The circuitry reassembles the outputs with the sign bit, exponent, and determined mantissa to provide a subnormal floating-point division result.

Example Method

Figure 11:
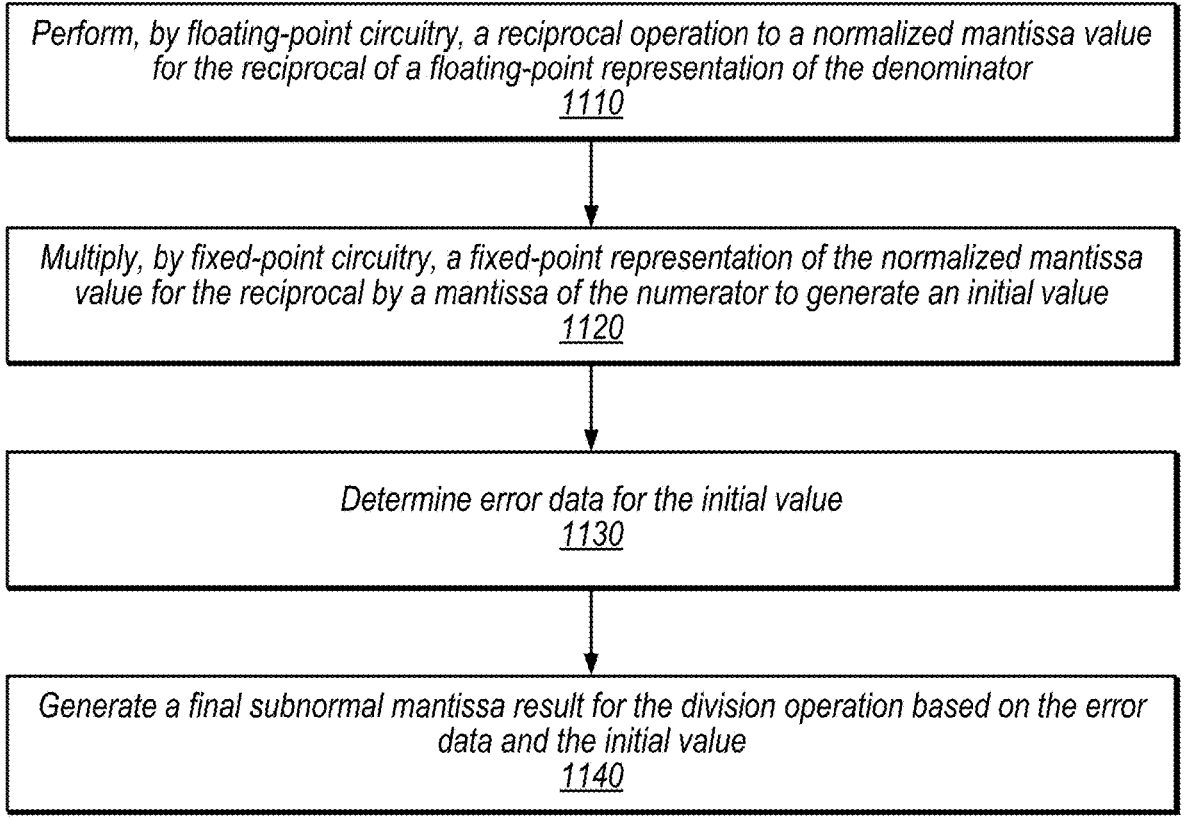
FIG. 11 is a flow diagram illustrating an example method, according to some embodiments.

FIG. 11 is a flow diagram illustrating an example method for generating a floating-point division result using operations that include fixed-point multiplication, according to some embodiments. The method shown in FIG. 11 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1110, in the illustrated embodiment, floating-point circuitry performs a reciprocal operation to a normalized mantissa value for the reciprocal of a floating-point representation of the denominator.

At 1120, in the illustrated embodiment, fixed-point circuitry multiplies a fixed-point representation of the normalized mantissa value for the reciprocal by a mantissa of the numerator to generate an initial value.

At 1130, in the illustrated embodiment, control circuitry (which may be included in the fixed-point circuitry, e.g., in a fixed-point multiply-accumulate unit) determines error data for the initial value.

In some embodiments, the fixed-point circuitry is configured to perform an integer instruction to determine the error data, where the integer instruction includes the denominator as an input operand. In these embodiments, the instruction may operate on the original denominator to determine error introduced by the reciprocal operation. In some embodiments (e.g., in fast mode), the control circuitry determines the error data based on guard, sticky, and least significant bits of the output of one or more shift operations performed on the initial value and generates the final subnormal mantissa result by incrementing the initial value based on the error data. In some embodiments, the fixed-point circuitry includes an increment circuit configured to increment the initial value.

In some embodiments (e.g., in precise mode), the apparatus is configured to execute multiple integer instructions to determine the error and generate the final subnormal mantissa result. These instructions may include, for example: an approximation instruction that generates an estimated reciprocal error based on the denominator and the reciprocal of the denominator, an adjustment instruction that generates an adjusted value by multiplying the initial value by the estimated reciprocal error, and one or more rounding instructions that round the adjusted value based on the numerator and the denominator. At least one of the one or more rounding instructions may utilize a flush to zero mode. In some embodiments, the estimated reciprocal error is determined as two minus the product of the denominator mantissa and the reciprocal of the denominator mantissa (e.g., as shown in the example of FIGS. 6-7). In some embodiments, the one or more rounding instructions include a first rounding instruction that assumes the division result is normal and a second rounding instruction that assumes the division result is subnormal and operates on intermediate results from the first rounding instruction (e.g., as shown in the example of FIGS. 6 and 9-10).

At 1140, in the illustrated embodiment, the control circuitry generates a final subnormal mantissa result for the division operation based on the error data and the initial value.

In various embodiments, the disclosed techniques may provide specified accuracy for floating-point division operations in one or more modes, using circuitry with reduced complexity and power consumption relative to traditional techniques.

Example Device

Figure 12:
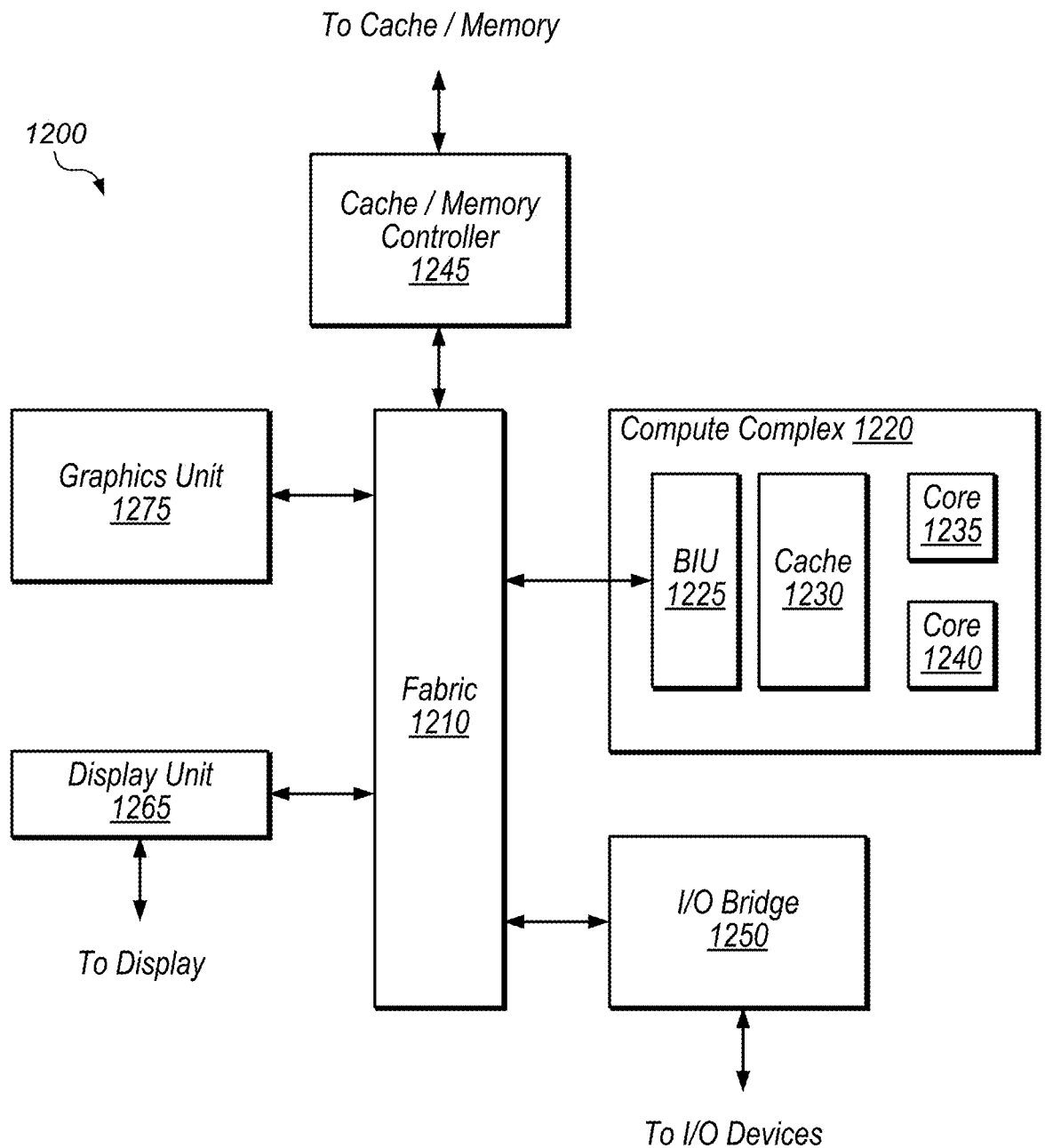
FIG. 12 is a block diagram illustrating an example computing device, according to some embodiments.

Referring now to FIG. 12, a block diagram illustrating an example embodiment of a device 1200 is shown. In some embodiments, elements of device 1200 may be included within a system on a chip. In some embodiments, device 1200 may be included in a mobile device, which may be battery-powered. Therefore, power consumption by device 1200 may be an important design consideration. In the illustrated embodiment, device 1200 includes fabric 1210, compute complex 1220 input/output (I/O) bridge 1250, cache/memory controller 1245, graphics unit 1275, and display unit 1265. In some embodiments, device 1200 may include other components (not shown) in addition to or in place of the illustrated components, such as video processor encoders and decoders, image processing or recognition elements, computer vision elements, etc.

Fabric 1210 may include various interconnects, buses, MUX's, controllers, etc., and may be configured to facilitate communication between various elements of device 1200. In some embodiments, portions of fabric 1210 may be configured to implement various different communication protocols. In other embodiments, fabric 1210 may implement a single communication protocol and elements coupled to fabric 1210 may convert from the single communication protocol to other communication protocols internally.

In the illustrated embodiment, compute complex 1220 includes bus interface unit (BIU) 1225, cache 1230, and cores 1235 and 1240. In various embodiments, compute complex 1220 may include various numbers of processors, processor cores and caches. For example, compute complex 1220 may include 1, 2, or 4 processor cores, or any other suitable number. In one embodiment, cache 1230 is a set associative L2 cache. In some embodiments, cores 1235 and 1240 may include internal instruction and data caches. In some embodiments, a coherency unit (not shown) in fabric 1210, cache 1230, or elsewhere in device 1200 may be configured to maintain coherency between various caches of device 1200. BIU 1225 may be configured to manage communication between compute complex 1220 and other elements of device 1200. Processor cores such as cores 1235 and 1240 may be configured to execute instructions of a particular instruction set architecture (ISA) which may include operating system instructions and user application instructions.

In some embodiments, disclosed circuitry is included in execution units of one or more processor cores.

Cache/memory controller 1245 may be configured to manage transfer of data between fabric 1210 and one or more caches and memories. For example, cache/memory controller 1245 may be coupled to an L3 cache, which may in turn be coupled to a system memory. In other embodiments, cache/memory controller 1245 may be directly coupled to a memory. In some embodiments, cache/memory controller 1245 may include one or more internal caches.

As used herein, the term "coupled to" may indicate one or more connections between elements, and a coupling may include intervening elements. For example, in FIG. 12, graphics unit 1275 may be described as "coupled to" a memory through fabric 1210 and cache/memory controller 1245. In contrast, in the illustrated embodiment of FIG. 12, graphics unit 1275 is "directly coupled" to fabric 1210 because there are no intervening elements.

Graphics unit 1275 may include one or more processors, e.g., one or more graphics processing units (GPU's). Graphics unit 1275 may receive graphics-oriented instructions, such as OPENGL®, Metal, or DIRECT3D® instructions, for example. Graphics unit 1275 may execute specialized GPU instructions or perform other operations based on the received graphics-oriented instructions. Graphics unit 1275 may generally be configured to process large blocks of data in parallel and may build images in a frame buffer for output to a display, which may be included in the device or may be a separate device. Graphics unit 1275 may include transform, lighting, triangle, and rendering engines in one or more graphics processing pipelines. Graphics unit 1275 may output pixel information for display images. Graphics unit 1275, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed circuitry is included in execution units of one or more programmable shader cores.

Display unit 1265 may be configured to read data from a frame buffer and provide a stream of pixel values for display. Display unit 1265 may be configured as a display pipeline in some embodiments. Additionally, display unit 1265 may be configured to blend multiple frames to produce an output frame. Further, display unit 1265 may include one or more interfaces (e.g., MIPI® or embedded display port (eDP)) for coupling to a user display (e.g., a touchscreen or an external display).

I/O bridge 1250 may include various elements configured to implement: universal serial bus (USB) communications, security, audio, and low-power always-on functionality, for example. I/O bridge 1250 may also include interfaces such as pulse-width modulation (PWM), general-purpose input/output (GPIO), serial peripheral interface (SPI), and inter-integrated circuit (I2C), for example. Various types of peripherals and devices may be coupled to device 1200 via I/O bridge 1250.

In some embodiments, device 1200 includes network interface circuitry (not explicitly shown), which may be connected to fabric 1210 or I/O bridge 1250. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1200 with connectivity to various types of other devices and networks.

Example Applications

Figure 13:
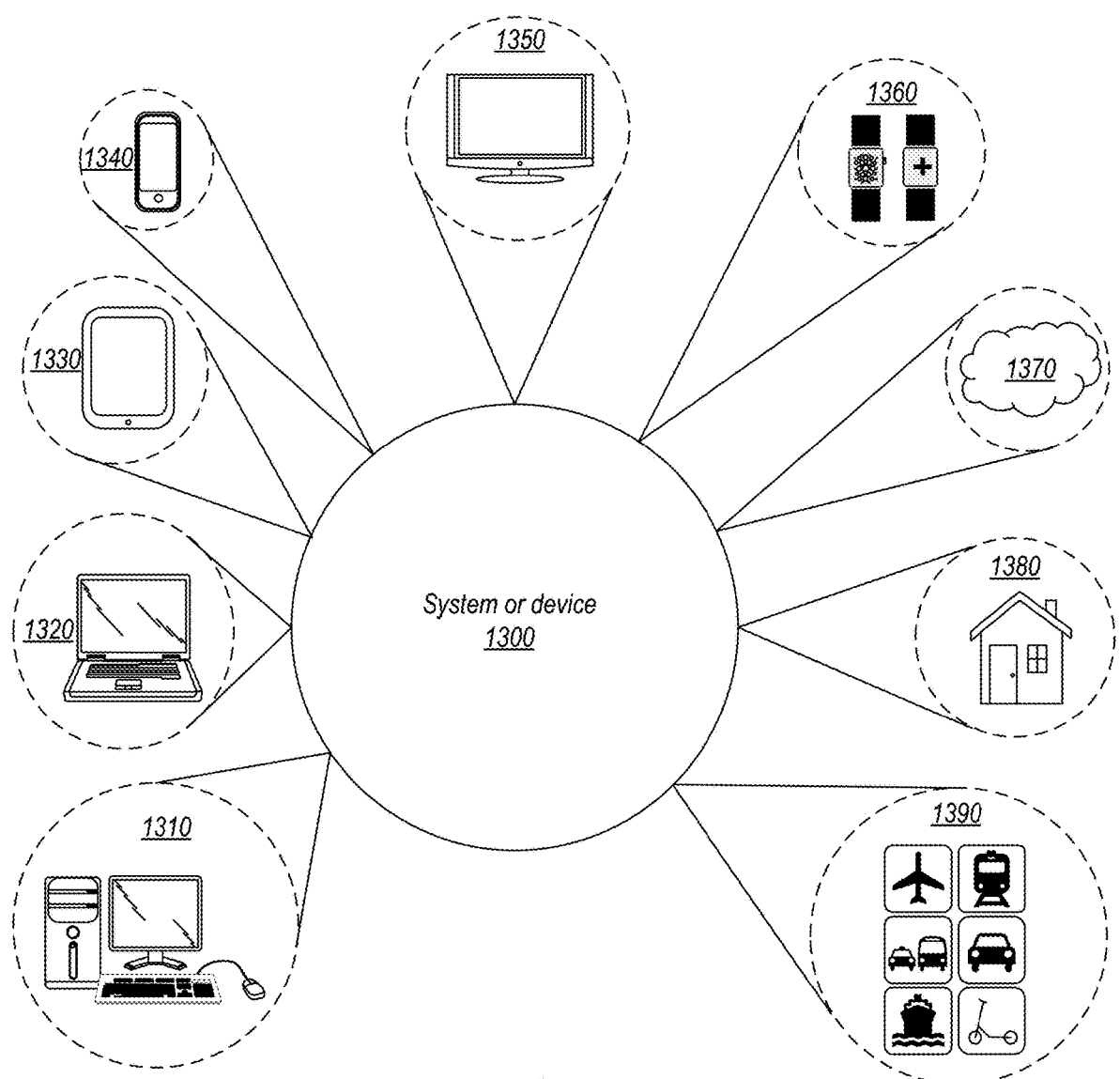
FIG. 13 is a diagram illustrating example applications of disclosed systems and devices, according to some embodiments.

Turning now to FIG. 13, various types of systems that may include any of the circuits, devices, or system discussed above. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 14:
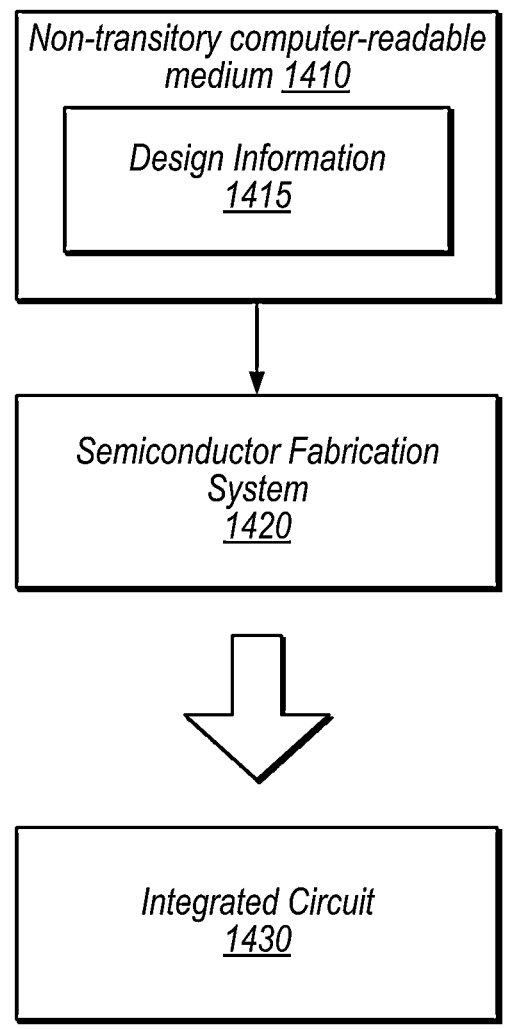
FIG. 14 is a block diagram illustrating an example computer-readable medium that stores circuit design information, according to some embodiments.

FIG. 14 is a block diagram illustrating an example non-transitory computer-readable storage medium that stores circuit design information, according to some embodiments. In the illustrated embodiment semiconductor fabrication system 1420 is configured to process the design information 1415 stored on non-transitory computer-readable medium 1410 and fabricate integrated circuit 1430 based on the design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system 1420. In some embodiments, design information 1415 may also include one or more cell libraries which specify the synthesis, layout, or both of integrated circuit 1430. In some embodiments, the design information is specified in whole or in part in the form of a netlist that specifies cell library elements and their connectivity. Design information 1415, taken alone, may or may not include sufficient information for fabrication of a corresponding integrated circuit. For example, design information 1415 may specify the circuit elements to be fabricated but not their physical layout. In this case, design information 1415 may need to be combined with layout information to actually fabricate the specified circuitry.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown in FIGS. 1, 2, 3, 12, and 13. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    circuitry configured to generate a subnormal result for a division operation that divides a numerator by a denominator, comprising:
        floating-point pipeline execution circuitry configured to perform a single reciprocal operation to determine a normalized mantissa value for a reciprocal of a floating-point representation of the denominator;
        fixed-point pipeline execution circuitry that includes:
            multiplier circuitry configured to, as part of performance of a single integer instruction by the fixed-point pipeline execution circuitry, multiply a fixed-point representation of the normalized mantissa value for the reciprocal by a mantissa of the numerator to generate an initial value;
            error circuitry configured to determine, as part of performance of the single integer instruction, error data based on one or more bits that are shifted out in one or more shift operations performed by shift circuitry on the initial value, wherein the single integer instruction includes the normalized mantissa value for the reciprocal of the floating-point representation of the denominator, the numerator, and at least a portion of the denominator as input operands; and
            selection circuitry configured to generate, as part of performance of the single integer instruction, a final subnormal mantissa result for the division operation, including to determine whether to increment the initial value based on the error data to generate the final subnormal mantissa result.

2. The apparatus of claim 1, wherein the fixed-point pipeline execution circuitry is configured to:
    determine the error data based on guard, sticky, and least significant bits of the output of one or more shift operations performed on the initial value; and
    generate the final subnormal mantissa result by incrementing the initial value based on the error data.

3. The apparatus of claim 1, wherein the fixed-point pipeline execution circuitry includes an increment circuit configured to increment the initial value.

4. The apparatus of claim 1, wherein the floating-point pipeline execution circuitry and the fixed-point pipeline execution circuitry are further configured to generate a more precise subnormal result for another division operation than the final subnormal mantissa result for the division operation, based on execution of three or more instructions.

5. The apparatus of claim 4, wherein the apparatus is configured to execute the single reciprocal operation and the single integer instruction using a smaller number of clock cycles than used to execute the three or more instructions.

6. The apparatus of claim 1, wherein the single integer instruction further includes a flush-to-zero input operand; and
wherein the flush-to-zero input operand indicates whether to flush the final subnormal mantissa result to correctly-signed zero.

7. A non-transitory computer-readable medium having instructions stored thereon that are executable by a computing device to perform operations comprising:
generating a subnormal result for a division operation that divides a numerator by a denominator, including:
executing, by a floating-point unit, a single floating-point instruction to perform a reciprocal operation to determine a normalized mantissa value for a reciprocal of a floating-point representation of the denominator;
executing, by a fixed-point unit, a single integer instruction to:
multiply, by integer multiplier circuitry, a fixed-point representation of the normalized mantissa value for the reciprocal by a mantissa of the numerator to generate an initial value;
determine, by error circuitry, error data based on one or more bits that are shifted out by shift circuitry in one or more shift operations performed on the initial value, wherein the single integer instruction includes the normalized mantissa value for the reciprocal of the floating-point representation of the denominator, the numerator, and at least a portion of the denominator as input operands; and
generate, by selection circuitry, a final subnormal mantissa result for the division operation, including to determine whether to increment the initial value based on the error data to generate the final subnormal mantissa result.

8. The non-transitory computer-readable medium of claim 7, wherein determining the error data is based on guard, sticky, and least significant bits of the output of one or more shift operations performed on the initial value; and
generating the final subnormal mantissa result includes incrementing the initial value based on the error data.

9. The non-transitory computer-readable medium of claim 7, the operations further comprising:
generating, by the floating-point unit and the fixed-point unit, based on execution of three or more instructions, a precise subnormal result for another division operation; and
wherein the precise subnormal result is more accurate relative to the final subnormal mantissa result.

10. The non-transitory computer-readable medium of claim 9, wherein the executing the single floating-point instruction and the single integer instruction uses a smaller number of clock cycles than used in execution of the three or more instructions.

11. The non-transitory computer-readable medium of claim 7, wherein the single integer instruction further includes a flush-to-zero input operand; and
wherein the flush-to-zero input operand indicates whether to flush the final subnormal mantissa result to correctly-signed zero.

12. A non-transitory computer-readable medium having stored thereon design information that specifies a design of at least a portion of a hardware integrated circuit in a format recognized by a semiconductor fabrication system that is configured to use the design information to produce the hardware integrated circuit according to the design, wherein the design information specifies that the hardware integrated circuit includes:
circuitry configured to generate a subnormal result for a division operation that divides a numerator by a denominator, comprising:
floating-point pipeline execution circuitry configured to perform a single reciprocal operation to determine a normalized mantissa value for a reciprocal of a floating-point representation of the denominator;
fixed-point pipeline execution circuitry that includes:
multiplier circuitry configured to, as part of performance of a single integer instruction by the fixed-point pipeline execution circuitry, multiply a fixed-point representation of the normalized mantissa value for the reciprocal by a mantissa of the numerator to generate an initial value;
error circuitry configured to determine, as part of performance of the single integer instruction, error data based on one or more bits that are shifted out in one or more shift operations performed by shift circuitry on the initial value, wherein the single integer instruction includes the normalized mantissa value for the reciprocal of the floating-point representation of the denominator, the numerator, and at least a portion of the denominator as input operands; and
selection circuitry configured to generate, as part of performance of the single integer instruction, a final subnormal mantissa result for the division operation, including to determine whether to increment the initial value based on the error data to generate the final subnormal mantissa result.

13. The non-transitory computer-readable medium of claim 12, wherein the fixed-point pipeline execution circuitry is configured to:
determine the error data based on guard, sticky, and least significant bits of the output of one or more shift operations performed on the initial value; and
generate the final subnormal mantissa result by incrementing the initial value based on the error data.

14. The non-transitory computer-readable medium of claim 13, wherein the fixed-point pipeline execution circuitry includes an increment circuit configured to increment the initial value.

15. The non-transitory computer-readable medium of claim 12, wherein the floating-point pipeline execution circuitry and the fixed-point pipeline execution circuitry are further configured to generate a more precise subnormal result for another division operation than the final subnormal mantissa result for the division operation, based on execution of three or more instructions.

16. The non-transitory computer-readable medium of claim 15, wherein the circuitry is configured to perform the single reciprocal operation and the single integer instruction using a smaller number of clock cycles than used to execute the three or more instructions.

17. The non-transitory computer-readable medium of claim 12, wherein the single integer instruction further includes a flush-to-zero input operand; and
wherein the flush-to-zero input operand indicates whether to flush the final subnormal mantissa result to correctly-signed zero.

* * * * *